(12) United States Patent
Morin et al.

(10) Patent No.: US 10,046,507 B2
(45) Date of Patent: Aug. 14, 2018

(54) DEVICE FOR GRIPPING A HOLLOW BODY HAVING AN ENHANCED CAPACITY FOR EVACUATING HEAT

(71) Applicant: SIDEL PARTICIPATIONS, Octeville-sur-Mer (FR)

(72) Inventors: Stephane Morin, Octeville-sur-Mer (FR); Bertrand Guise, Octeville-sur-Mer (FR); Christophe Doudement, Octeville-sur-Mer (FR); Pierre Heuzebroc, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/478,502

(22) Filed: Apr. 4, 2017

(65) Prior Publication Data
US 2017/0282438 A1 Oct. 5, 2017

(30) Foreign Application Priority Data
Apr. 5, 2016 (FR) ..................................... 16 52949

(51) Int. Cl.
*B29C 49/42* (2006.01)
*B29C 49/64* (2006.01)
(Continued)

(52) U.S. Cl.
CPC ...... *B29C 49/6463* (2013.01); *B29C 49/4205* (2013.01); *B29C 49/06* (2013.01);
(Continued)

(58) Field of Classification Search
CPC ............ B29C 49/4205; B29C 49/6409; B29C 49/6463
See application file for complete search history.

(56) References Cited

U.S. PATENT DOCUMENTS 4,846,656 A * 7/1989 Denis .................. B29C 49/6409
425/174.4
7,008,215 B2 3/2006 Goss
(Continued)

FOREIGN PATENT DOCUMENTS

| DE | 10 2007 037 400 A1 | 2/2009 |
| FR | 3 011 498 A1 | 4/2015 |
| WO | 2013/034309 A1 | 3/2013 |

OTHER PUBLICATIONS

French Search Report, dated Dec. 15, 2016, from corresponding FR application.

*Primary Examiner* — Robert B Davis
(74) *Attorney, Agent, or Firm* — Young & Thompson

(57) ABSTRACT

A device for gripping a hollow body includes a freely-rotating shaft and a mandrel that is integral with the shaft. The mandrel itself includes: an end fitting; a radiator that is mounted directly on the end fitting; a crosspiece inserted between the end fitting and the radiator; an expandable ring mounted between the end fitting and the crosspiece; an elastic element mounted between the end fitting and the expandable ring; an insert made of a material with high thermal conductivity, set in a housing made in the end fitting and emptying onto a free end face of the former, with the insert extending up to the point facing the radiator.

20 Claims, 7 Drawing Sheets

(51) Int. Cl.
*B29K 67/00* (2006.01)
*B29L 31/00* (2006.01)
*B29C 49/06* (2006.01)

(52) U.S. Cl.
CPC .... *B29C 49/6409* (2013.01); *B29K 2067/003* (2013.01); *B29K 2905/02* (2013.01); *B29L 2031/7158* (2013.01)

(56) References Cited

U.S. PATENT DOCUMENTS

| | | | |
|---|---|---|---|
| 2006/0157896 A1* | 7/2006 | Lee | B29C 49/6409 264/345 |
| 2011/0120840 A1 | 5/2011 | Schonberger | |
| 2013/0087964 A1* | 4/2013 | Zhang | B29C 49/4205 269/287 |
| 2016/0207244 A1 | 7/2016 | Le Roux et al. | |

* cited by examiner

DEVICE FOR GRIPPING A HOLLOW BODY HAVING AN ENHANCED CAPACITY FOR EVACUATING HEAT

BACKGROUND OF THE INVENTION

Field of the Invention

The invention relates to conveying hollow bodies, in particular preforms made of plastic material (for example, polyethylene terephthalate or PET), in a container manufacturing line.

Description of the Related Art

A container made of plastic material is conventionally formed by blow molding or stretch blow molding starting from a preform that comprises an essentially cylindrical body that is closed by a hemispherical bottom and, at the other end, an open neck, which is separated from the body by a collar and has its final shape.

To allow the forming of the container, the body and the bottom of the preform are subjected to a heating to soften them by bringing them to a temperature (so-called heating temperature) that is higher than the glass transition temperature of the material. In the case of the PET, which has a glass transition temperature of approximately 80° C., the heating temperature is generally approximately 120° C.

The heating of the preform is ordinarily carried out in a furnace that is equipped with infrared radiation sources (generally halogen lamps). The preform is mounted on a revolving support called a "spinner," provided at one end with a mandrel that is forced into the neck and at another end with a pinion that engages a rack. The spinner moves the preform in front of the lamps, while driving it in rotation to expose the entire body to radiation.

The cutaway view of FIG. 1 illustrates the structure of a known spinner 100, which is installed on production lines during operation.

This spinner 100, mounted (in pairs) on a link 200 of a transport chain, comprises:

- A steel shaft 110, mounted in rotation in relation to the link 200 and at an upper end of which a pinion 120 is attached,
- An ejector 130 that is stationary in relation to the link 200, and
- A mandrel 140 that is integral with the shaft 110.

The mandrel 140 includes:

- A steel crosspiece 150 that is screwed into a lower end of the shaft 110,
- An aluminum radiator 160 that is forced onto the crosspiece 150,
- An end fitting 170 that is fixed by screwing to the crosspiece 150, which is inserted between the radiator 160 and the end fitting 170,
- A radially expandable ring 180, mounted between the end fitting 170 and the crosspiece 150, and
- An elastic seal 190 that forces the radial expansion of the ring 180.

As can be seen in FIG. 1, a first impression 151 is formed in the crosspiece 150 for accommodating a tool such as a screwdriver or an Allen key that makes it possible to ensure the screwing of the crosspiece 150 into a threaded cross-section 152 of the shaft 110. A second impression 171 is, furthermore, formed in the end fitting 170 for accommodating a tool (in this case, an Allen key) that makes it possible to ensure the screwing of the end fitting 170 into a threaded cross-section 172 of the crosspiece 150. As can also be seen in FIG. 1, the two impressions 151, 171 are coaxial, and the second impression 171 is of a size greater than the first impression 151 to make possible the free passage of the tool that corresponds to the former.

A spinner with a similar structure is presented in the U.S. Pat. No. 7,008,215 (Graham Packaging).

The function of the radiator 160, equipped with a series of fins 161, is to limit the heating of the mandrel (and therefore of the neck of the preform that is forced on above) by heat exchange with the ambient air. Without this, the accumulation of calories at the level of the mandrel would have harmful consequences on the production line. First of all, too significant an expansion of the end fitting (under the action of the heat) is able to bring about its wedging in the neck of the preform. Then, taking into account the thermal inertia of the metals, the end fitting, the crosspiece, and the expandable ring, all three in contact with the neck of the preform are able to deform the former by transferring to it a portion of the calories thereof.

To prevent this phenomenon, it was determined that the temperature of the mandrel should not exceed the boundary temperature of 60° C. However, it was noted that, for a heating temperature of 120° C., this boundary temperature is sometimes exceeded, and the above-mentioned consequences occur.

SUMMARY OF THE INVENTION

One objective is to ensure a better thermal regulation of the spinners.

A second objective is, for this purpose, to ensure a better evacuation of the calories accumulated by the mandrel while the preform is being heated.

For this purpose, in the first place, a device for gripping a hollow body is proposed, which device comprises:

- A freely-rotating shaft;
- A mandrel that is integral with the shaft, with this mandrel comprising:
  - An end fitting,
  - A radiator mounted directly on the end fitting,
  - A crosspiece inserted between the end fitting and the radiator,
  - An expandable ring mounted between the end fitting and the crosspiece,
  - An elastic element mounted between the end fitting and the expandable ring,
  - An insert made of a material with high thermal conductivity, set in a housing made in the end fitting and emptying onto a free end face of the former, with the insert extending up to the point facing the radiator.

The insert acts as a heat pipe and ensures an effective transport of calories from the neck of the preform to the radiator, which ensures the dissipation thereof. The result is a reduced operating temperature, enhancing the reliability of the gripping device.

Various additional characteristics can be provided, by themselves or in combination:

- The insert is made of aluminum;
- The insert is cylindrical, and the housing comes in the form of a bore;
- The insert is mounted in a tightened manner in the housing;
- The radiator has a tapped cross-section through which it is screwed onto a corresponding threaded cross-section of the end fitting;
- The radiator has a smooth cylindrical cross-section, by which it is forced onto a corresponding smooth cylindrical cross-section of the end fitting;

The insert has an outside diameter that is greater than or equal to 50% of the outside diameter of the smooth cylindrical cross-section of the end fitting;

The outside diameter of the insert is approximately 60% of the outside diameter of the smooth cylindrical cross-section of the end fitting;

The end fitting has a threaded end cross-section by which it is screwed into a corresponding tapped cross-section of the shaft.

In the second place, a unit for heating a hollow body, which comprises a number of gripping devices as presented above, is proposed.

BRIEF DESCRIPTION OF THE DRAWINGS

Other objects and advantages of the invention will become evident from the description of an embodiment, given below with reference to the accompanying drawings in which.

Figure 1:
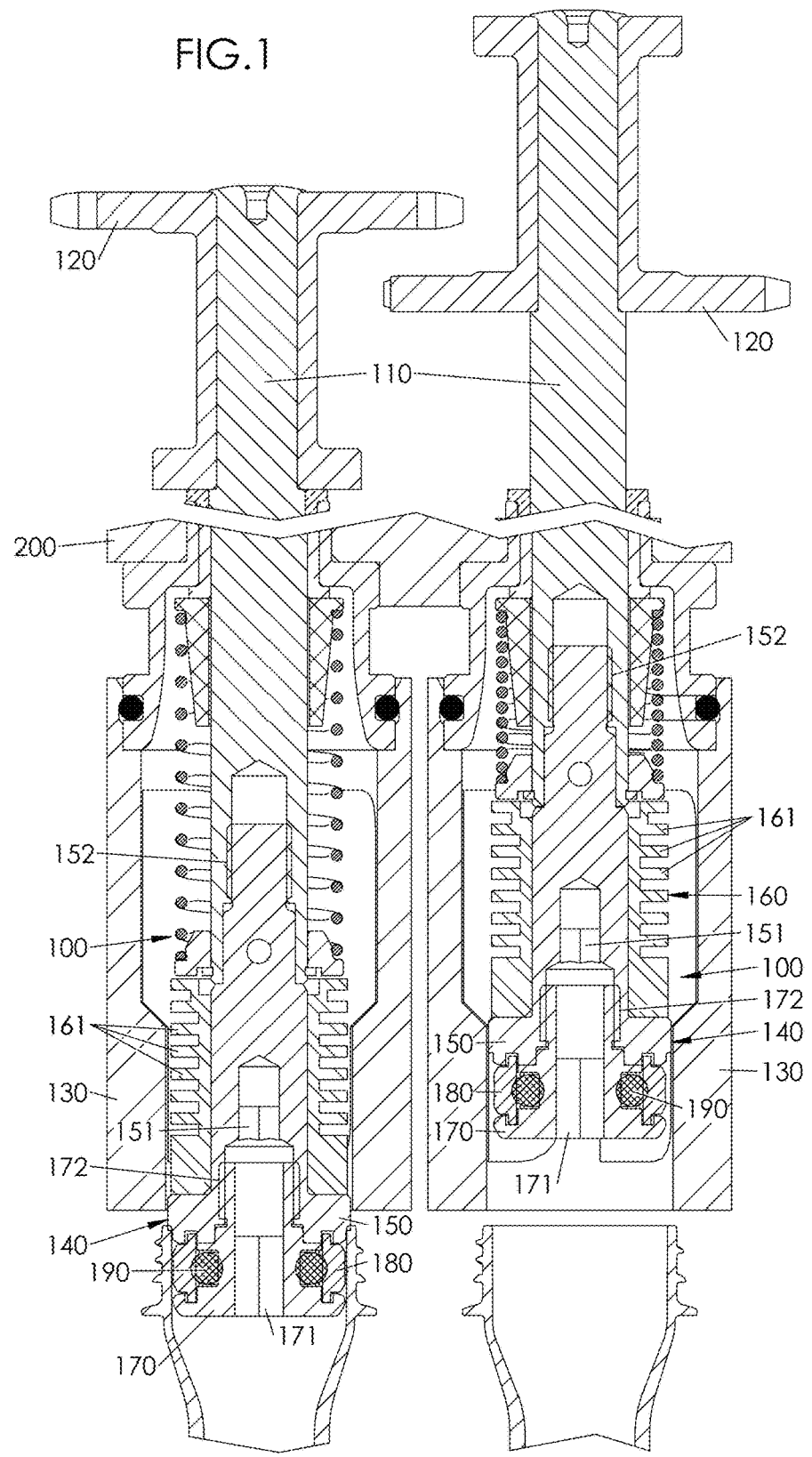
FIG. 1 is a cutaway view showing a pair of spinners of known structure of the prior art.
Figure 2:
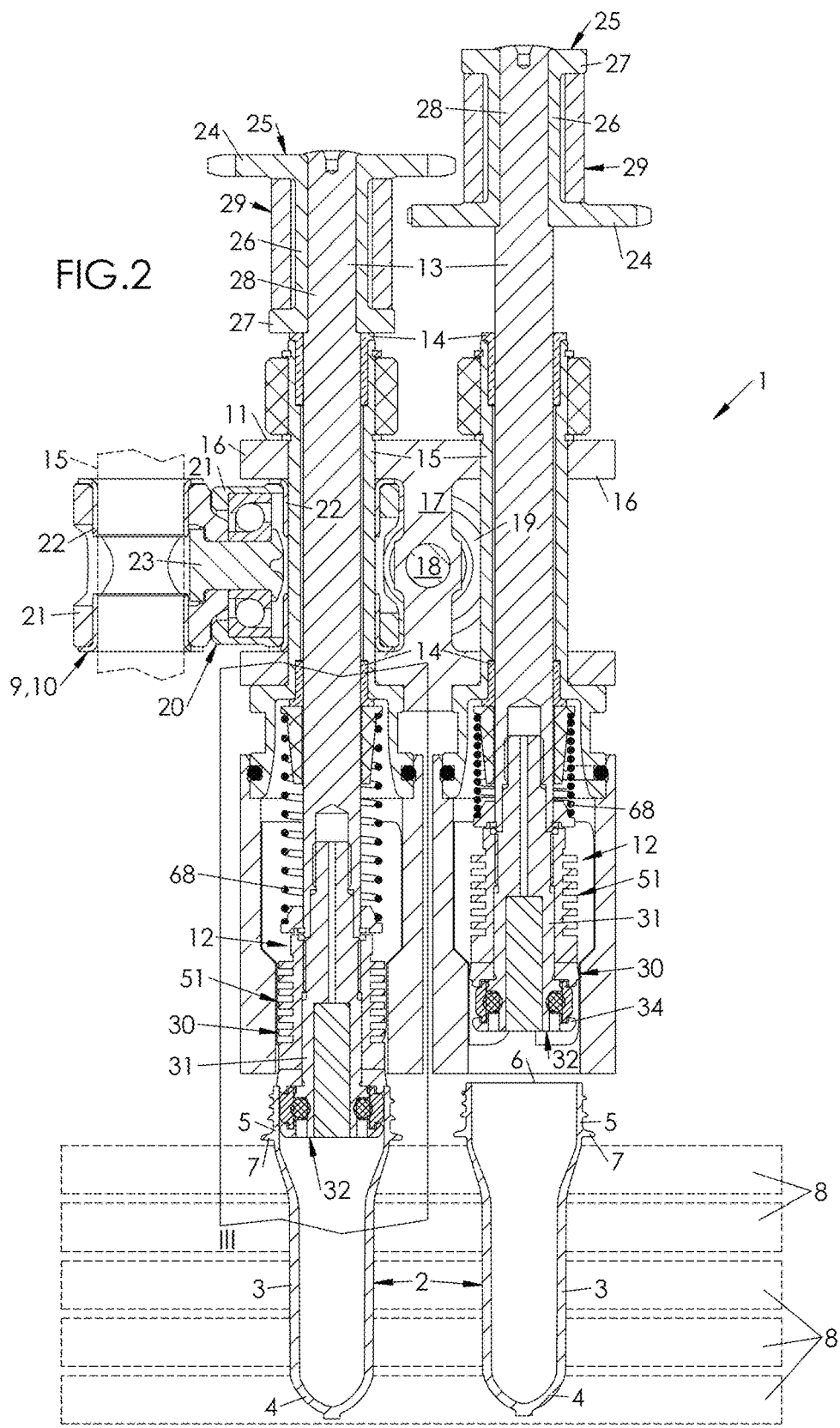
FIG. 2 is a cutaway view showing a pair of spinners according to a first embodiment, one (on the left) shown in a covering position, and the other (on the right) in the uncovering position.
Figure 6:
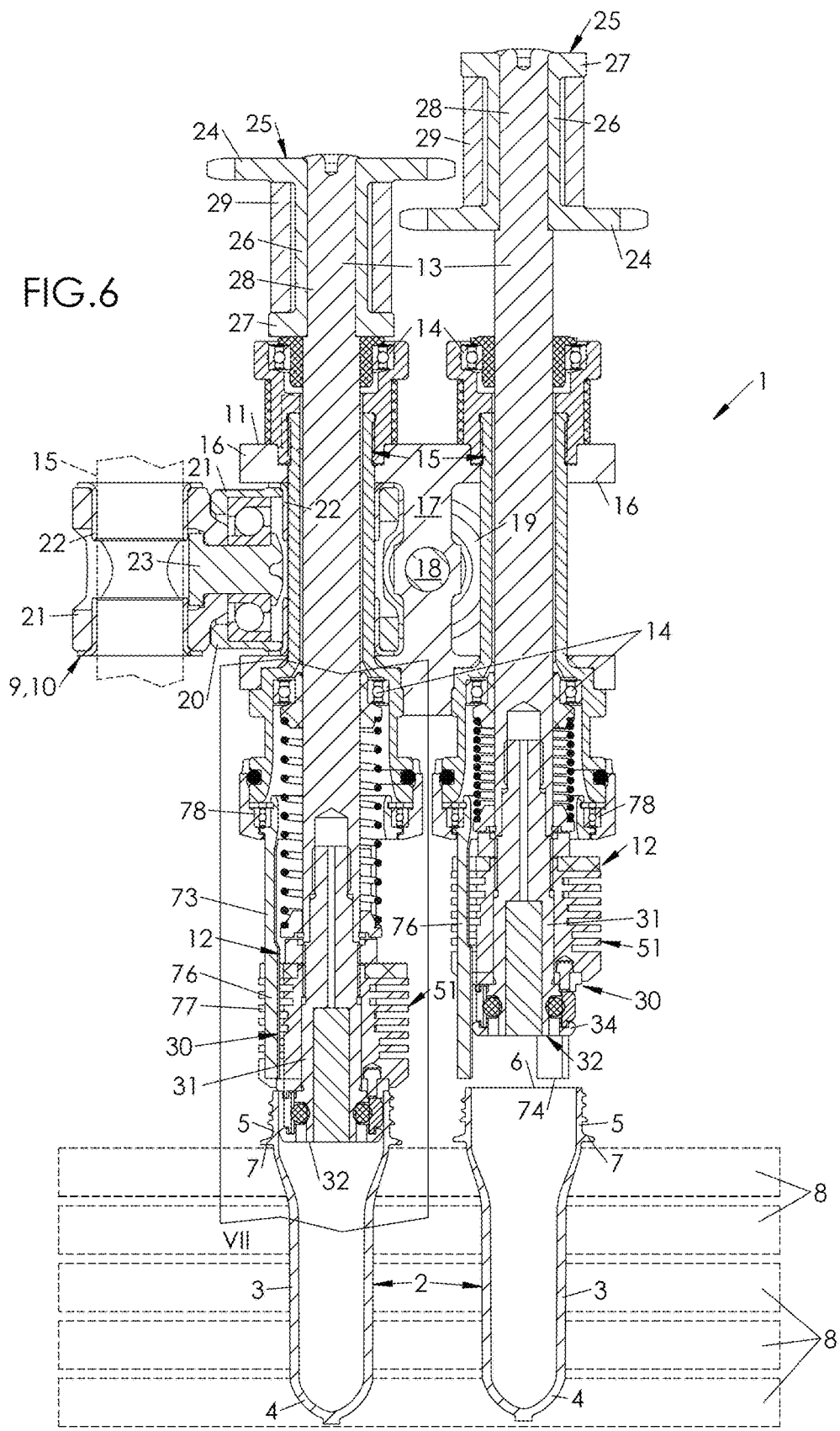
FIG. 6 is a cutaway view showing a pair of spinners according to a second embodiment, one (on the left) shown in the covering position and the other (on the right) in the uncovering position.

A unit 1 for heating hollow bodies 2 made of plastic material is partially illustrated in FIGS. 2 and 6. In the illustrated example, the hollow bodies 2 are preforms from each of which a container (such as a bottle or a flask) is intended to be formed by blow molding or stretch blow molding. In the description below and in the claims, the reference 2 will be attached equally well to the terms "hollow body(ies)" or "preform(s)."

Each preform 2 comprises a body 3 with an essentially cylindrical shape closed by a bottom 4 (here in an essentially hemispherical shape) and a neck 5 that is opened by a rim 6 at one end of the body 3 opposite to the bottom 4. The neck 5, which already has its final shape on the preform 2, is separated from the body 3 by an annular collar 7 that projects radially.

As can be seen in FIGS. 2 and 6, the heating unit 1 is equipped with a number of infrared radiation sources 8 (for example, halogen lamps), and a conveyor 9 arranged for transporting the preforms 2 by exposing the body 3 and the bottom 4 to the radiation of radiation sources 8 for bringing them to a heating temperature that is higher than the glass transition temperature of the material. In the case of polyethylene terephthalate (PET), whose glass transition temperature is approximately 80° C., the heating temperature is, for example, approximately 120° C.

The conveyor 9 comprises a transport chain 10 that integrates a number of interconnected links 11, and, for each preform 2, a device 12 for gripping the preform 2, also called "spinner" and mounted on a link 11. In the examples that are illustrated in FIGS. 2 and 6, each link 11 carries a pair of adjacent identical spinners 12.

In the first place, each spinner 12 comprises a shaft 13 that is mounted in free rotation, as well as in translation, in relation to the link 11. In the illustrated examples, the shaft 13 is mounted by means of a pair of bearings 14 (which can be plain bearings in the form of cushions made of a material with a low friction coefficient, for example bronze, as illustrated in FIG. 2, or ball bearings, as illustrated in FIG. 6) in a case 15 that is integral with the link 11.

The shaft 13 is preferably made of steel, for the reasons of mechanical strength and resistance to wear and tear.

As can be seen in FIGS. 2 and 6, the link 11, advantageously made of steel, comprises two paired screeds 16, into each of which a shaft 13 is inserted vertically. The screeds 16 are separated by a partition 17 into which is forced a pin 18 that bears a roller 19 rolling on a rail for supporting and guiding the transport chain 10.

As can also be seen in FIGS. 2 and 6, each link 11 is interconnected with the adjacent link 11 by means of a coupling 20 that comprises a pair of sleeves 21, each mounted in rotation on a vertical pin on a case 15 (by means of cushions 22 with a low friction coefficient) and mounted in relation to one another in rotation of a horizontal pin by means of a shaft 23 that comes, in the illustrated example, in the form of a rivet.

At an upper end, the spinner 12 is provided with a pinion 24 that is attached to the shaft 13 and is integral in rotation with the former. This pinion 24 engages a stationary rack that extends along the heating unit 1 to drive the shaft 13 (and, with it, the entire spinner 12) in rotation while the chain 10 is driven in translation (by means of, for example, a driving wheel) in such a way as to expose the entire body 3 and the bottom 4 of the preform 2 to the infrared radiation of the sources 8. In the example illustrated in FIGS. 2 and 6, the pinion 24 is integrated with a part 25 in the form of a coil that comprises a barrel 26, at one end of which extends the pinion 24, and, opposite the former, a flask 27 with a diameter that is smaller than the pinion 24. The part 25 is attached to the shaft 13 by being, for example, mounted on a cross-section 28 of the upper end of the former, with a reduced diameter, and then secured to the shaft 13 by deformation of the end of the former, in the manner of a rivet.

The part 25 is intended to work by engaging with a fork 29 of an actuator that can move in vertical translation to move the spinner 12 between a so-called covering position (on the left in FIGS. 2 and 6) in which the spinner 12 is, at a lower end, engaged in the neck 5 of a preform 2 for supporting the former while it is being heated and a so-called uncovering position (to the right in FIGS. 2 and 6), in which the spinner 12 is removed from the preform 2 to make possible the transfer of the former toward a forming unit once the heating has ended.

For this purpose, the spinner 12 comprises a mandrel 30 that is integral with the shaft 13 and intended to engage, in the covering position, in the neck 5 of a preform 2.

Figure 3:
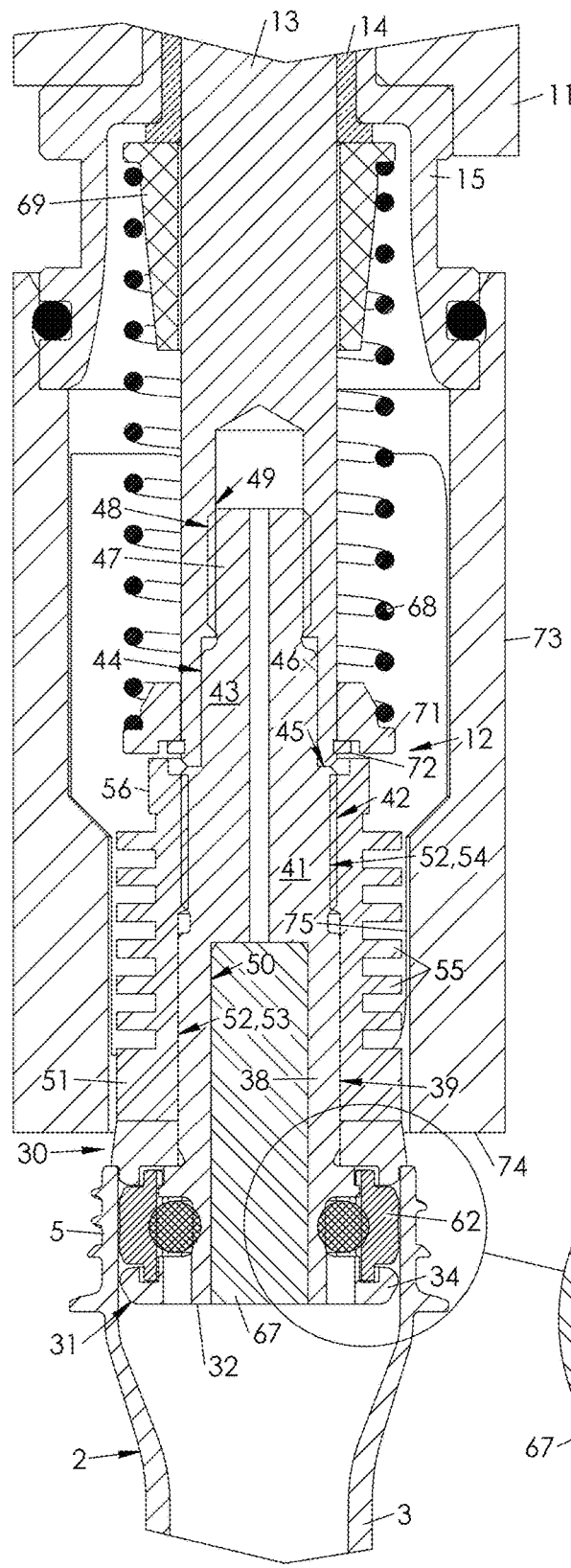
FIG. 3 is a detail view of a spinner according to the insert III of FIG. 2, with, in an inset, a detail on an enlarged scale.

In the first place, this mandrel 30 comprises an end fitting 31 that is integral with the shaft 13. As can be seen in FIG. 3 (and more particularly in the detail inset), the end fitting 31, which comes in the form of a single piece made of steel (for the sake of mechanical strength) and is more specifically made of stainless steel, is staged. It comprises, on the side of a face 32 of a free end opposite to the shaft 13, a lower cross-section 33 that, in the covering position, is housed in the preform 2.

Figure 5:
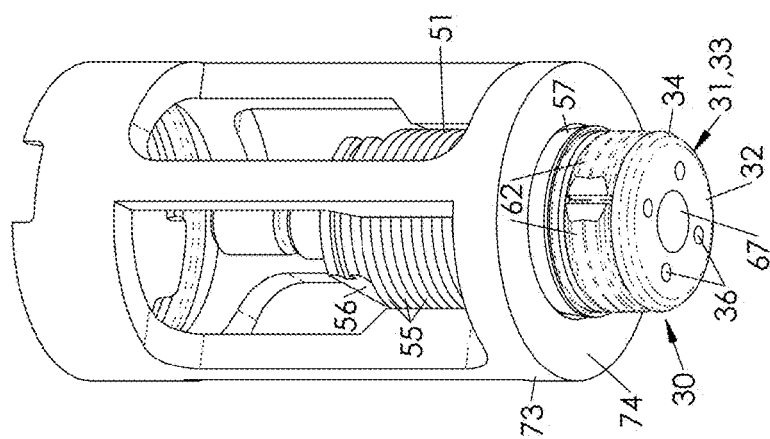
FIG. 5 is a bottom perspective view showing the ejector and the mandrel of FIG. 4.
Figure 9:
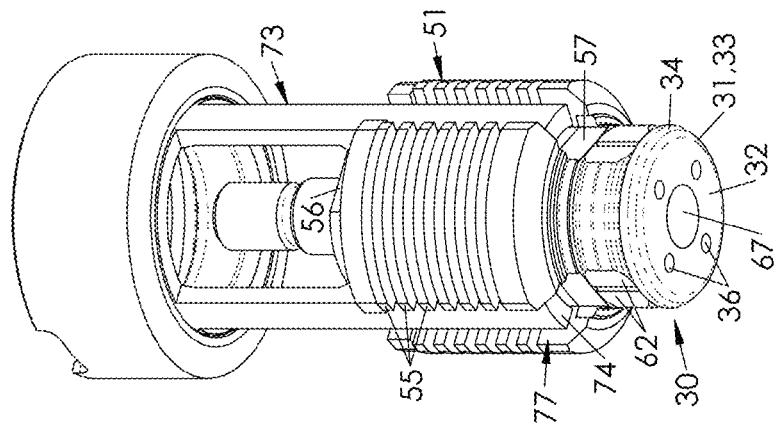
FIG. 9 is a bottom perspective view showing the ejector and the mandrel of FIG. 8.

In the vicinity of the free end face 32 of the end fitting 31, the lower cross-section 33 comprises a collar 34 that projects radially, in which a so-called lower annular groove 35 is morticed. As illustrated in FIGS. 3 and 5, on the one hand, and in FIGS. 7 and 9, on the other hand, the lower cross-section 33 of the end fitting 31 is provided with an impression 36 that is intended to accommodate a tightening key. In the illustrated examples, this impression 36 comes in the form of a series of holes (in this case, four in number) that are pierced in the face 32 of the free end of the end fitting 31.

The lower cross-section 33 of the end fitting 31 is furthermore provided with a groove 37 that forms a local restriction in diameter of the lower cross-section 33.

The end fitting 31 comprises a first intermediate cross-section 38 that tops the lower cross-section 33 and has a smooth cylindrical outside face 39, with a diameter that is smaller than the lower cross-section 33, whose first intermediate cross-section 38 is separated by a lower shoulder 40.

The end fitting 31 comprises a second intermediate cross-section 41 that tops the first intermediate cross-section 38 and has a threaded outside face 42.

The end fitting 31 comprises a third intermediate cross-section 43 that tops the second intermediate cross-section 41 and has a smooth cylindrical outside face 44, with a diameter that is smaller than those of the first intermediate cross-section 38 and the second intermediate cross-section 41. This third intermediate cross-section 43, separated from the second intermediate cross-section 41 by an upper shoulder 45, is forced into a smooth cylindrical lower cross-section 46 that is formed in the shaft 13.

Finally, the end fitting 31 comprises an upper cross-section 47 that has a threaded cylindrical outside face 48. This upper cross-section 47 works by screwing using its threaded cylindrical outside face 48 with a tapped upper cross-section 49 that is formed in the shaft 13 and that tops the smooth lower cross-section 46.

Figure 7:
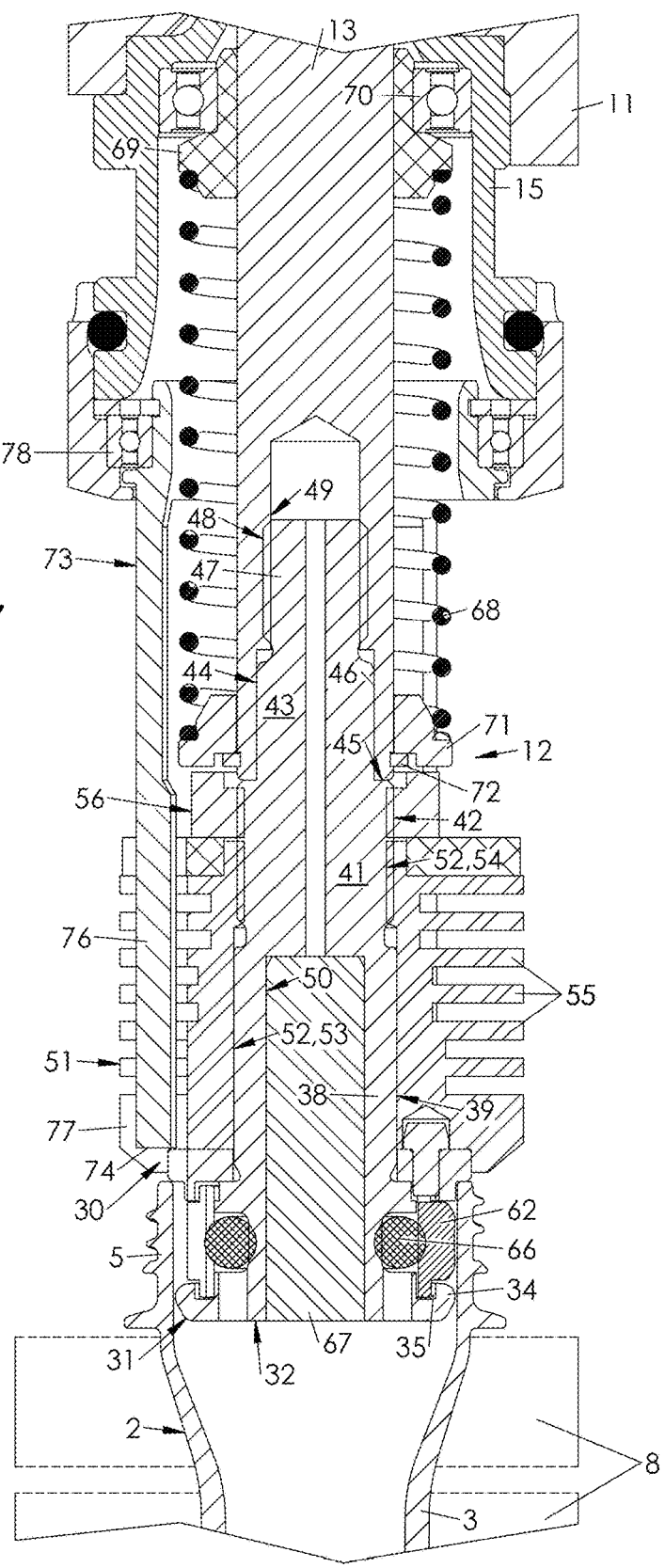
FIG. 7 is a detail view of a spinner, according to the inset VII of FIG. 6.

As illustrated in FIGS. 3 and 7, a housing 50 is made in the end fitting 31, with this housing 50 emptying onto the free end face 32.

In the second place, the mandrel 30 comprises a radiator 51. This radiator 51 comes in the form of a hollow sleeve that is provided, on the one hand, on the inside, with a central bore 52 that has a smooth lower cross-section 53 and a tapped upper cross-section 54, and, on the other hand, on the outside, with a series of fins 55 that have as their function to dissipate the heat that is absorbed by the radiator 51.

The radiator 51 is mounted directly on the end fitting 31. More specifically, the lower cross-section 53 of the bore 52 is forced onto the first intermediate cross-section 38, in such a way as to ensure a close thermal contact of these two elements. In addition, to ensure a durable attachment of the radiator 51 onto the end fitting 31, the tapped upper cross-section 54 of the radiator 51 is screwed onto the second intermediate cross-section 41 of the end fitting 31. Preferably, this screwing is advantageously supplemented by a bonding by means of a glue that is designed to ensure the braking of the threaded parts while being capable of withstanding heat, for example an ester dimethacrylate-type acrylic glue. A glue of this type is marketed in particular by the Loctite Company under the name Loctite 222 (registered trademark).

Figure 4:
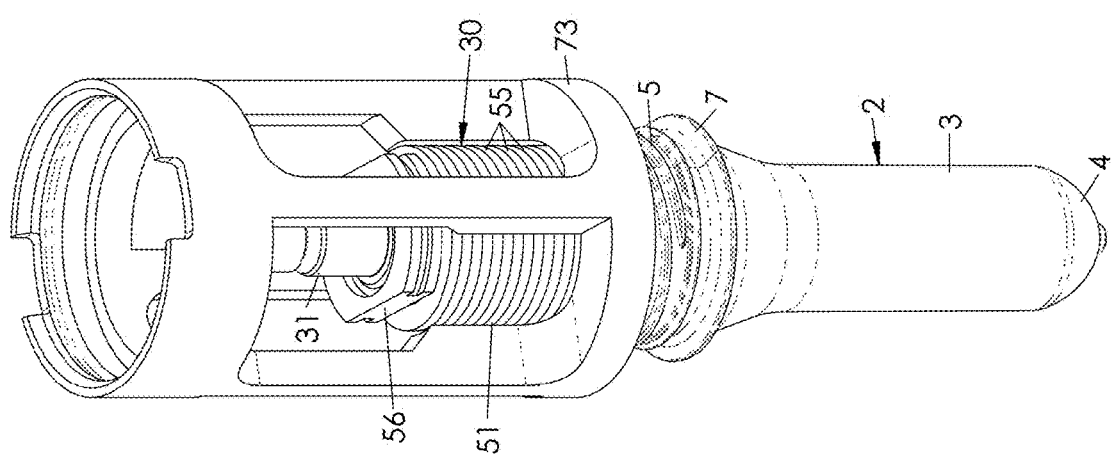
FIG. 4 is a top perspective view showing the ejector and the mandrel of a spinner according to the first embodiment, with a preform.
Figure 8:
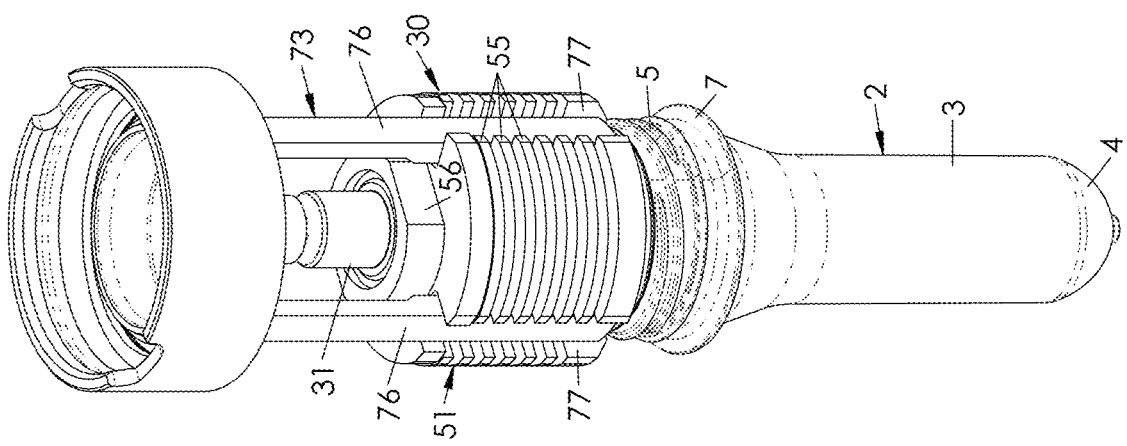
FIG. 8 is a top perspective view showing the ejector and the mandrel of a spinner according to the second embodiment, with a preform.

As can be seen in particular in FIGS. 4 and 8, an upper end 56 of the radiator 51 is shaped like a nut, in the form of—in the illustrated examples—a pair of parallel flat surfaces, able to accommodate a flat key to ensure the screwing of the radiator 51 onto the end fitting 31 while the former is fixed in rotation by means of a spanner wrench working with the impression 36 that is formed in the free end face 32 of the end fitting 31.

In the third place, the mandrel 30 comprises a crosspiece 57 that is inserted between the end fitting 31 and the radiator 51 by being sandwiched between a lower face 58 of the radiator 51 and the lower shoulder 40.

This crosspiece 57 comes in the form of an annular part that is provided with a central bore 59 by which it is forced onto the first intermediate cross-section 38 of the end fitting 31. As can be seen in FIGS. 3 and 7, the crosspiece 57 has an annular lip 60 that projects facing the collar 34 and that, together with the part of the lower cross-section 33 of the end fitting 31 located between the groove 37 and the lower shoulder 40, forms a so-called upper annular groove 61, situated axially facing the lower groove 35.

In the fourth place, the mandrel 30 comprises an expandable ring 62 that is mounted between the end fitting 31 and the crosspiece 57. This ring 62 is advantageously subdivided into multiple sectors, the spaces between which cause a radial expansion of the ring 62. As illustrated in FIGS. 3 and 7, the ring 62 has a lower edge 63 that is engaged in the lower groove 35, an upper edge 64 that is engaged in the upper annular groove 61, as well as a central bead 65, that, under the action of the radial expansion of the ring 62, ensures, in the covering position, the locking of the preform 2 in relation to the mandrel 30, by friction against the inside wall of the neck 5.

In the fifth place, the mandrel 30 comprises an elastic element 66 that is mounted between the end fitting 31 and the expandable ring 62. In the examples illustrated in FIGS. 3 and 7, this elastic element 66 comes in the form of an O-ring seal that is mounted in the groove 37 of the lower cross-section 33 of the end fitting 31. This seal 66 is made of an elastomer, for example a natural or synthetic rubber, in particular silicone or Viton (registered trademark referring to a fluoroelastomer marketed by the DuPont Company). The elastic nature of this seal 66 brings about the radial expansion of the ring 62 to ensure the gripping of the preform 2 in the manner described above, when, in the covering position, the lower cross-section 33 of the end fitting 31 is engaged in the neck 5.

In the sixth place, the mandrel 30 comprises an insert 67 that is made of a material with high thermal conductivity, set in the housing 50, i.e., the insert 67 is mounted with zero play in the housing 50 to maximize the contact surface between the insert 67 and the end fitting 31. In this context, the thermal conductivity of a material is said to be high if it is greater than or equal to 100 $W.m^{-1}.K^{-1}$.

Thanks to the high thermal conductivity, the insert 67 performs a heat pipe function (i.e., a thermal bridge) between, on the one hand, the lower cross-section 33 of the end fitting 31, subjected to a heating due to a direct exposure to a portion of the radiation of the sources 8 and to a heat transfer of calories obtained from the preform 2, both by contact (via the collar 34 and the expandable ring 62) and by convection, and, on the other hand, the radiator 51.

To maximize the heat exchanges and the evacuation of calories, and as can be seen in FIGS. 3 and 7, the insert 67 extends up to the point facing the radiator 51. For this purpose, the housing 50 extends up to the point facing the first intermediate cross-section 38. In the examples illustrated, the housing 50 (and therefore the insert 67, which occupies the entire housing 50) extends up to the vicinity of the junction between the first intermediate cross-section 38 and the second intermediate cross-section 41.

In the absence of such a heat pipe, the transmission of the end fitting 31 to the radiator 51 of calories obtained from heating would be done just the same, but in a less effective manner, because the thermal conductivity of the steel (material of which the end fitting 31 is made) is relatively low: this thermal conductivity is actually encompassed, depending on the steels, between 15 and 50 $W.m^{-1}.K^{-1}$. The presence and the positioning of the insert 67, which extends from the free end face 32 of the end fitting 31 up to the point facing the radiator 51, accelerates the evacuation of calories, enhancing an effective thermal regulation of the end fitting 31, and therefore of the mandrel 30.

The insert 67 is preferably made of aluminum (this term also covering the aluminum alloys). It is possible to use an aluminum that is not an alloy, whose thermal conductivity is between 200 and 240 $W.m^{-1}.K^{-1}$. In addition to this high thermal conductivity, pure aluminum offers the advantage of being particularly resistant to corrosion (the atmosphere of the heating unit 1 can be moist because of the preforms 2 taking up water). However, it may be advantageous to use an aluminum alloy whose mechanical properties (and in particular the mechanical strength) are better than those of pure aluminum and whose thermal conductivity is just slightly lower, or even comparable. Thus, the insert 67 can be made of an alloy 6060 (nomenclature AFNOR) or AlMgSi0.5 (nomenclature DIN), which has a thermal conductivity on the order of 200 $W.m^{-1}.K^{-1}$ and which contains, in percentage by mass, the following elements:

Silicon (Si) between 0.3 and 0.6
Iron (Fe) between 0.1 and 0.3
Copper (Cu) 0.1
Manganese (Mn) 0.1
Magnesium (Mg) between 0.35 and 0.6
Chromium (Cr) 0.05
Zinc (Zn) 0.15
Titanium (Ti) 0.1
Aluminum: balance According to a particular embodiment, the insert 67 is cylindrical (i.e., it comes in the form of a bar), and the housing 50, in a corresponding manner, comes in the form of a bore.

The insert 67 is preferably mounted in a tightened manner in the housing 50. This tightened mounting is advantageously done under cold conditions, with the thermal expansion of the aluminum (alloy or not), greater than that of the steel, reinforcing the tightening of the insert 67 in its housing during the heating.

It is advantageous to maximize the diameter of the insert 67 in relation to the outside diameter of the first intermediate cross-section 38 (i.e., in relation to the inside diameter of the smaller cross-section 53 of the bore 52). Also, the insert 67 preferably has an outside diameter that is greater than or equal to 50% of the outside diameter of the first intermediate cross-section 38 of the end fitting 31.

The radial grip of the insert 67 should not, however, be such that it hampers the mechanical strength of the end fitting 31 (and therefore of the mandrel 30). It has been determined that an outside diameter of the insert 67 of approximately 60% of the outside diameter of the first intermediate cross-section 38 of the end fitting 31 constitutes a good compromise, optimizing the conduction of heat while preserving the mechanical strength of the end fitting 31.

The fact that the insert 67 extends up to the point facing the radiator 51 enhances the rapidity of heat exchanges with one another.

To facilitate the evacuation of heat by the radiator 51, the former is advantageously made of a material with high thermal conductivity, for example aluminum.

The spinner 12 furthermore comprises a return element 68 of the mandrel 30 toward the covering position. This return element 68 comes, in the examples illustrated in FIGS. 3 and 7, in the form of a compression spring mounted on the shaft 13 by being inserted between the case 15 (via an upper ring 69, which can itself be supported against a bearing 70), and a lower end of the shaft 13 (via a lower ring 71, which can be supported against a snap ring 72 mounted on the shaft 13).

The spinner 12 also comprises a hollow ejector 73, mounted on the case 15 by being stationary in axial translation (i.e., vertical) in relation to the former. The ejector 73 has a lower end face 74 that, in the uncovering position of the mandrel, is flattened against the rim 6 of the preform 2 to lock the former during the removal of the mandrel 30 from the neck 5.

According to a first embodiment illustrated in FIGS. 2 to 5, the ejector 73 is also stationary in rotation in relation to the case 15 by being engaged on a lower end of the former. As can be seen in FIGS. 4 and 5, the ejector 73 is perforated to make possible the evacuation of calories through the fins 55 of the radiator 51. In this first embodiment, the radiator 51 is completely housed in a bore 75 that is made in the ejector 73.

According to a second embodiment that is illustrated in FIGS. 6 to 9, the outside diameter of the radiator 51 is larger than that of the ejector 73, which comprises a series of pins 76 extending axially into the respective cutouts 77 formed in the radiator 51. In this second embodiment, the ejector 73 is integral in rotation with the mandrel 30 (while being free in translation in relation to the former) and therefore freely rotates in relation to the case 15, on which the ejector 73 is mounted by means of a bearing 78 (in the example illustrated in FIG. 7, this bearing 78 is a ball bearing).

To initiate the assembly of the mandrel 30, the procedure is as follows.

The first step is to insert the O-ring seal 66 into the groove 37. The expandable ring 62 (i.e., the three sectors that constitute it) is then mounted around the O-ring seal 66, in this case by inserting the lower edge 63 into the lower groove 35.

The crosspiece 57 is then forced onto the first intermediate cross-section 38 of the end fitting 31 by coming to rest against the lower shoulder 40. In this position, the upper edge 64 of the expandable ring 62 is housed in the upper annular groove 61. In this way, the ring 62 is immobilized in translation between the collar 34 of the end fitting 31 and the crosspiece 57, while enhancing a radial play that makes it possible, under the return action of the seal 66, to expand in order to come to rest, in the covering position, against the inside wall of the neck 5.

The next step consists in mounting the radiator 51 on the end fitting 31 by forcing the smooth lower cross-section 53 of the radiator 51 onto the first intermediate cross-section 38 of the end fitting 31, while screwing the tapped upper cross-section 54 of the radiator 51 onto the second threaded intermediate cross-section 41 of the end fitting 31. The locking in rotation of the end fitting 31 is done by means of a spanner wrench that works with the impression 36 formed in the free end face 32 of the end fitting 31, while the screwing of the radiator 51 is done by means of a wrench that works with the nut formed at the upper end 56 of the radiator 51. The glue that is intended to ensure the irreversibility of the attachment of the radiator 51 to the end fitting 31 can be applied by brush on the tapped cross-section 54 before screwing is initiated.

The end fitting 31 is then attached to the shaft 13, with the third intermediate cross-section 43 being inserted into the smooth lower cross-section 46 that is formed in the shaft 13, while the upper cross-section 47 of the end fitting 31 is screwed into the tapped upper cross-section 49 that is formed in the shaft 13, until the upper shoulder 45 abuts against the end of the shaft 13. To immobilize the shaft 13 during the screwing of the end fitting 31 by means of the wrench provided with lugs inserted into the impression 36, the shaft 13 is preferably provided with a pair of opposing flat surfaces that are able to work with a wrench.

The switch from the covering position to the uncovering position (and, if necessary, vice versa) is controlled by the fork 29 that is engaged on the barrel 26 of the part 25, between the pinion 24 and the flask 27.

In the uncovering position, the lower cross-section 33 of the end fitting 31 is housed in the ejector 73 by being located axially set back in relation to the end face 32 of the former, in such a way as to allow the release of the preform 2.

In the covering position, toward which the mandrel 30 is permanently stressed by the spring that constitutes the return element 68, the lower cross-section 33 of the end fitting 31 is, with the ring 62 and the lip 60 of the crosspiece 57, engaged in the neck 5 of a preform 2, which is thus made integral with it (in a reversible manner) both in translation and in rotation.

The advantages, in terms of heat, that are obtained by the structure of the mandrel 30, have already been explained. Actually, it has been noted that the operating temperature of the mandrel 30 can be kept at a level of less than 60° C., and even less than 50° C., and in particular at approximately 45° C.

This leads to a better thermal regulation of the spinners 12, owing to a better evacuation of the calories accumulated by the mandrel 30 during the heating of the preform 2, enhancing the reliability of the heating unit 1 overall.

The invention claimed is:

1. Device (12) for gripping a hollow body (2), which comprises:
    A freely-rotating shaft (13);
    A mandrel (30) that is integral with the shaft (13), with this mandrel (30) comprising:
        An end fitting (31),
        A radiator (51),
        A crosspiece (57) inserted between the end fitting (31) and the radiator (51),
        An expandable ring (62) mounted between the end fitting (31) and the crosspiece (57),
        An elastic element (66) mounted between the end fitting (31) and the expandable ring (62),
    wherein:
    The radiator (51) is mounted directly on the end fitting (31),
    The mandrel (30) comprises an insert (67) made of a material with high thermal conductivity, set in a housing (50) made in the end fitting (31) and emptying onto a free end face (32) of the former, with the insert (67) extending up to the point facing the radiator (51).

2. Device (12) according to claim 1, wherein the insert (67) is made of aluminum.

3. Device (12) according to claim 1, wherein the insert (67) is cylindrical, and the housing (50) comes in the form of a bore.

4. Device (12) according to claim 1, wherein the insert (67) is mounted in a tightened manner in the housing.

5. Device (12) according to claim 1, wherein the radiator (51) has a tapped cross-section (54) by which it is screwed onto a corresponding threaded intermediate cross-section (41) of the end fitting (31).

6. Device (12) according to claim 1, wherein the radiator (51) has a smooth cylindrical cross-section (53), by which it is forced onto a corresponding smooth cylindrical cross-section (38) of the end fitting (31).

7. Device (12) according to claim 6, wherein the insert (67) has an outside diameter that is greater than or equal to 50% of the outside diameter of the smooth cylindrical cross-section (38) of the end fitting (31).

8. Device (12) according to claim 7, wherein the outside diameter of the insert (67) is approximately 60% of the outside diameter of the smooth cylindrical cross-section (38) of the end fitting (31).

9. Device (12) according to claim 1, wherein the end fitting (31) has a threaded end cross-section (47) by which it is screwed into a corresponding tapped cross-section (49) of the shaft (13).

10. Unit (1) for heating a hollow body, which comprises a number of gripping devices (12) according to claim 1.

11. Device (12) according to claim 2, wherein the insert (67) is cylindrical, and the housing (50) comes in the form of a bore.

12. Device (12) according to claim 2, wherein the insert (67) is mounted in a tightened manner in the housing.

13. Device (12) according to claim 3, wherein the insert (67) is mounted in a tightened manner in the housing.

14. Device (12) according to claim 2, wherein the radiator (51) has a tapped cross-section (54) by which it is screwed onto a corresponding threaded intermediate cross-section (41) of the end fitting (31).

15. Device (12) according to claim 3, wherein the radiator (51) has a tapped cross-section (54) by which it is screwed onto a corresponding threaded intermediate cross-section (41) of the end fitting (31).

16. Device (12) according to claim 4, wherein the radiator (51) has a tapped cross-section (54) by which it is screwed onto a corresponding threaded intermediate cross-section (41) of the end fitting (31).

17. Device (12) according to claim 2, wherein the radiator (51) has a smooth cylindrical cross-section (53), by which it is forced onto a corresponding smooth cylindrical cross-section (38) of the end fitting (31).

18. Device (12) according to claim 3, wherein the radiator (51) has a smooth cylindrical cross-section (53), by which it is forced onto a corresponding smooth cylindrical cross-section (38) of the end fitting (31).

19. Device (12) according to claim 4, wherein the radiator (51) has a smooth cylindrical cross-section (53), by which it is forced onto a corresponding smooth cylindrical cross-section (38) of the end fitting (31).

20. Device (12) according to claim 5, wherein the radiator (51) has a smooth cylindrical cross-section (53), by which it is forced onto a corresponding smooth cylindrical cross-section (38) of the end fitting (31).

* * * * *